United States Patent
Yarbrough

[15] 3,665,299
[45] May 23, 1972

[54] TEST APPARATUS FOR DETERMINING CONTINUITY PATHS ON A MULTI-TERMINAL ARRANGEMENT

[72] Inventor: Kenneth A. Yarbrough, 1030 Medalist, Dallas, Tex. 75232

[22] Filed: Mar. 2, 1970

[21] Appl. No.: 14,796

Related U.S. Application Data

[63] Continuation of Ser. No. 622,698, Aug. 23, 1967, abandoned.

[52] U.S. Cl. .................................................324/51, 324/73
[51] Int. Cl. ...........................................................G01r 31/02
[58] Field of Search ......................................324/51, 66, 73

[56] References Cited

UNITED STATES PATENTS

| | | | |
|---|---|---|---|
| 3,441,849 | 4/1969 | Bennett et al. | 324/73 |
| 3,219,927 | 11/1965 | Topp et al. | 324/73 |
| 3,286,175 | 11/1966 | Gerbier et al. | 324/73 |
| 3,492,571 | 1/1970 | Desler | 324/51 X |
| 3,476,888 | 11/1969 | Rollins et al. | 324/66 X |
| 3,311,890 | 3/1967 | Waaben | 324/73 UX |

Primary Examiner—Gerard R. Strecker
Attorney—Donald Gunn

[57] ABSTRACT

Test apparatus preferably comprising a signal forming means connected to a selected drive point which is one of the terminals, scanning apparatus for scanning the plurality of terminals, means for ascertaining electrical continuity between the driven point and each scanned point whereby continuity is either desired or undesired depending on the accuracy and faithfulness of wiring to the plurality of terminals, and output means identifying errors in test point wiring between the terminals.

9 Claims, 7 Drawing Figures

Kenneth A. Yarbrough
INVENTOR.

BY Donald Gunn

Kenneth A. Yarbrough
INVENTOR.

BY Donald Gunn

Kenneth A. Yarbrough
INVENTOR.

Patented May 23, 1972 3,665,299

Table 1

| | X | Y |
|---|---|---|
| DP | 00 | 00 |
| CP | 01 | 01 |
| CP | 01 | 02 |
| CP | 02 | 03 |
| CP | 03 | 03 |
| DP | 01 | 00 |
| CP | 03 | 01 |
| CP | 03 | 02 |
| CP | 01 | 03 |
| CP | 01 | 04 |
| DP | 02 | 00 |
| CP | 02 | 01 |
| CP | 02 | 02 |
| DP | 03 | 00 |
| CP | 04 | 00 |
| CP | 04 | 01 |

Kenneth A. Yarbrough
INVENTOR.

BY Donald Gunn

TEST APPARATUS FOR DETERMINING CONTINUITY PATHS ON A MULTI-TERMINAL ARRANGEMENT

This application is a continuation of application, Ser. No. 622,698, filed Aug. 23, 1967, now abandoned.

SUMMARY OF PROBLEM AND INVENTION

Numerous multiple terminal matrix arrays fabricated for use in electronic assemblies are wired from terminal to terminal. The permutations and combinations of wiring introduce the likelihood of error and therefore the necessity for very accurate testing. Consider, for purposes of discussion, a multiple terminal pattern having one hundred terminals in each column and row. The total number of terminals is 10,000 terminals. Quite often, the wiring pattern for a large grid will vary in the manufacture of telephone equipment, computers, electronic test equipment, interfacing apparatus, and the like. Given ten thousand points, it is quite difficult to verify or confirm both the presence of desired wiring patterns in the matrix and the absence of undesired wiring connections. Of course, if only one or two wires are joined to the multiple terminals, it is easy to visually inspect the apparatus. However, to verify accurate assembly of the terminals and wiring harness with a number of wires extending over the terminal board is difficult, if not impossible, with any degree of reliability.

Often a basic terminal board is devised wherein differing models of equipment are fabricated by use of differing wiring patterns on the basic terminal pattern. For instance, in a particular product line, a large multiple point terminal board basic to all models is used for optional wiring patterns connecting several of the thousands of points. It is with a view of testing multiple terminal apparatus that the present apparatus provides high-speed testing of the wiring between terminals, verification of all desired wiring paths, and proof that undesired wiring paths are absent. Therefore, the present invention is summarized as providing an input means for receiving from a data medium the coordinates descriptive of points in a wiring pattern, means for imposing on a selected terminal a predetermined electrical condition whereby any terminal wired thereto will indicate continuity, means for scanning a plurality of terminals to ascertain connection of any of the terminals to the driven terminal, and means operative with terminal scanning to determine the presence or absence of an error in the wiring.

One object of the present invention is to provide a new and improved test apparatus for a plurality of terminals which scan at electronic speeds all of the plurality of points with respect to one selected point to ascertain desired patterns of continuity.

Another object of the present invention is to provide a new and improved test apparatus for a plurality of terminals whereby the terminals are scanned sequentially in a two-coordinate system.

An important object of the present invention is to provide a new and improved high-speed continuity test set wherein data is input indicating a first or driven point and all points having continuity therewith are ascertained.

Yet another object of the present invention is to provide a new and improved high-speed continuity test set wherein a first point is selected and the remaining terminals are scanned and a second test point is selected wherein the scanning for continuity with the second point avoids redundant scanning of points tested earlier in the test routine.

Yet another object of the present invention is to provide a new and improved high-speed continuity test set for use with a plurality of terminals whereby desired paths of continuity are confirmed while the apparatus tests for continuity at additional although undesired terminals.

A elated object of the present invention is to provide a new and improved high-speed continuity test set which ascertains and prints out the information identifying terminals having undesired continuity with other terminals in the pattern.

Yet another object of the present invention is to provide a high-speed continuity test set for comparing experienced wiring patterns with intended wiring patterns among a plurality of terminals which includes means indicating the nature of errors and their location.

Other objects and advantages of the present invention will become more readily apparent from a consideration of the included drawings wherein.

Figure 5:
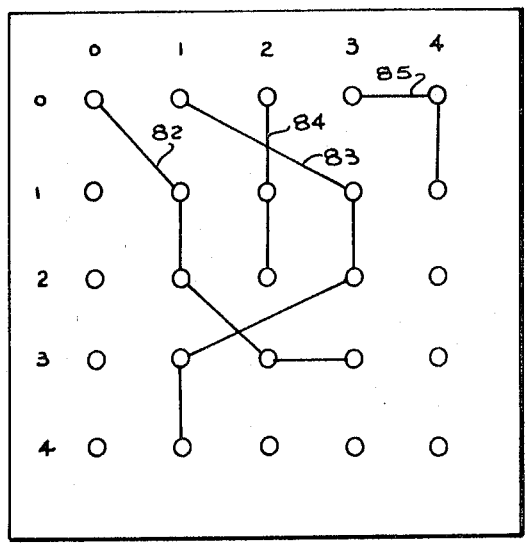
FIG. 5 is a programming model of the plurality of terminals.
Figure 7:
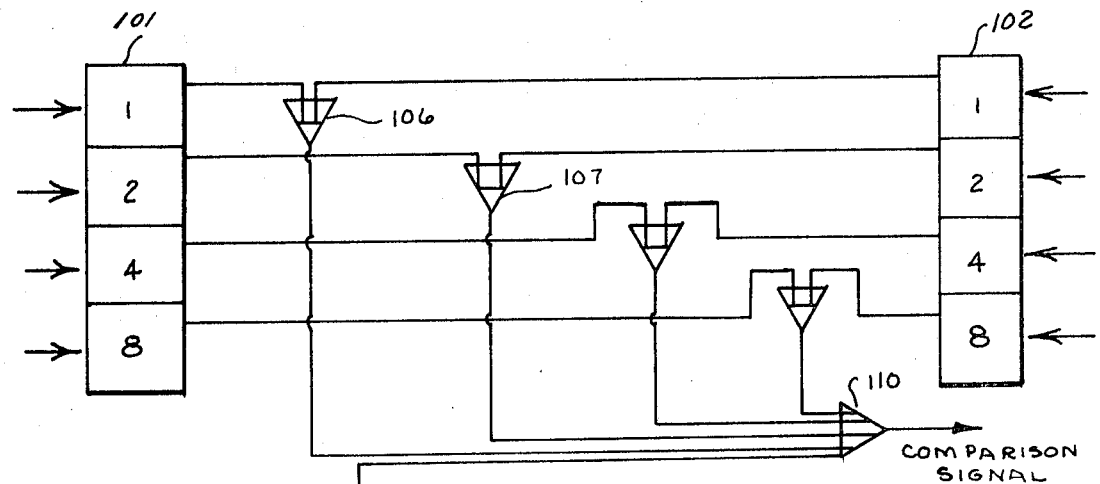
Figure 7:
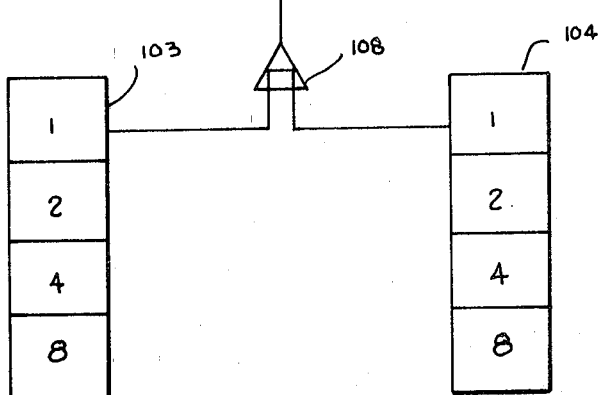
Figure 6:
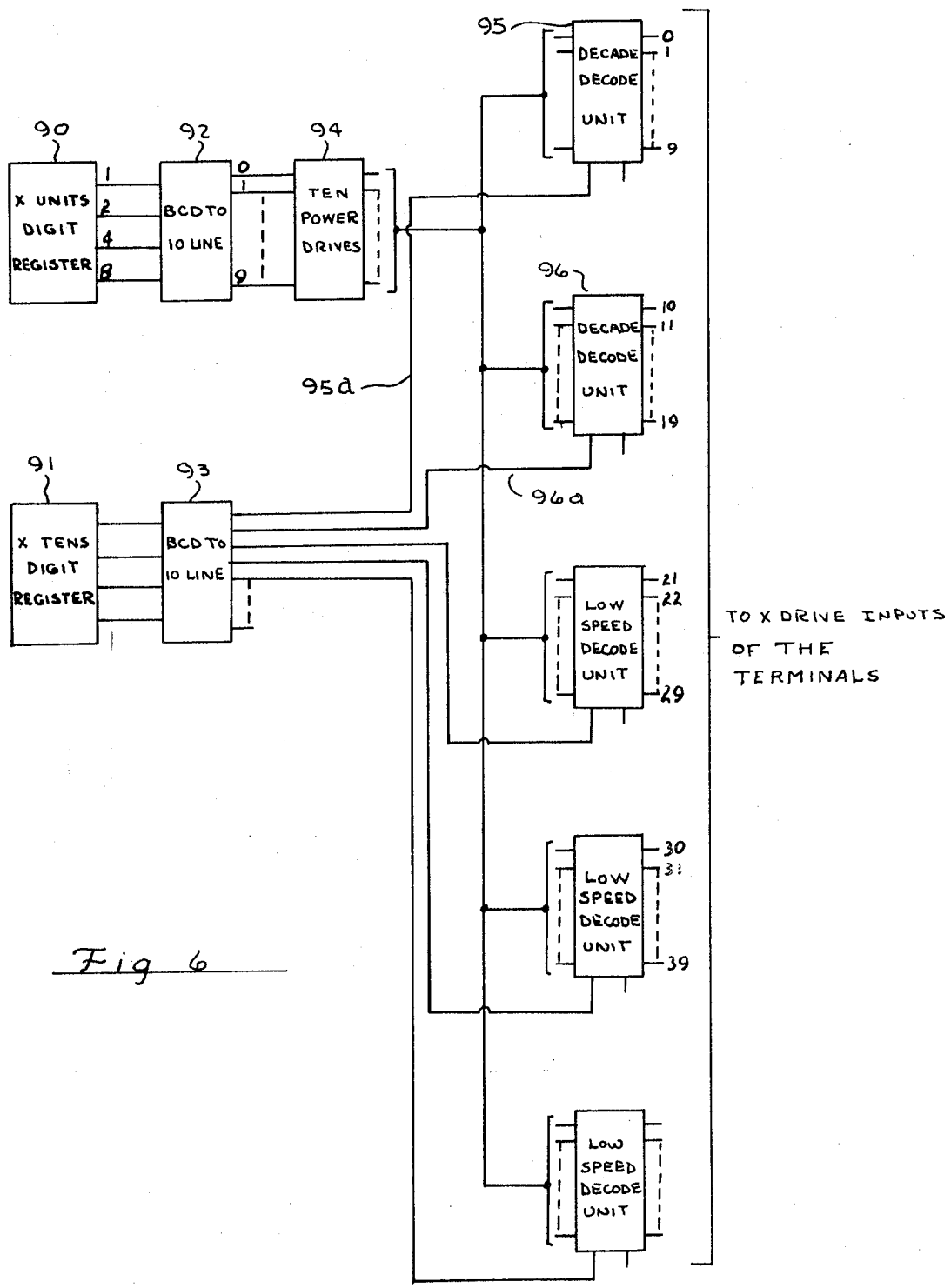

Table 1 is the encoded test data for the wiring shown in the programming model of FIG. 5;

FIG. 6 is a more detailed schematic of a BCD decode driver circuitry; and,

FIG. 7 is a detailed schematic of a BCD decode comparator.

Figure 1:
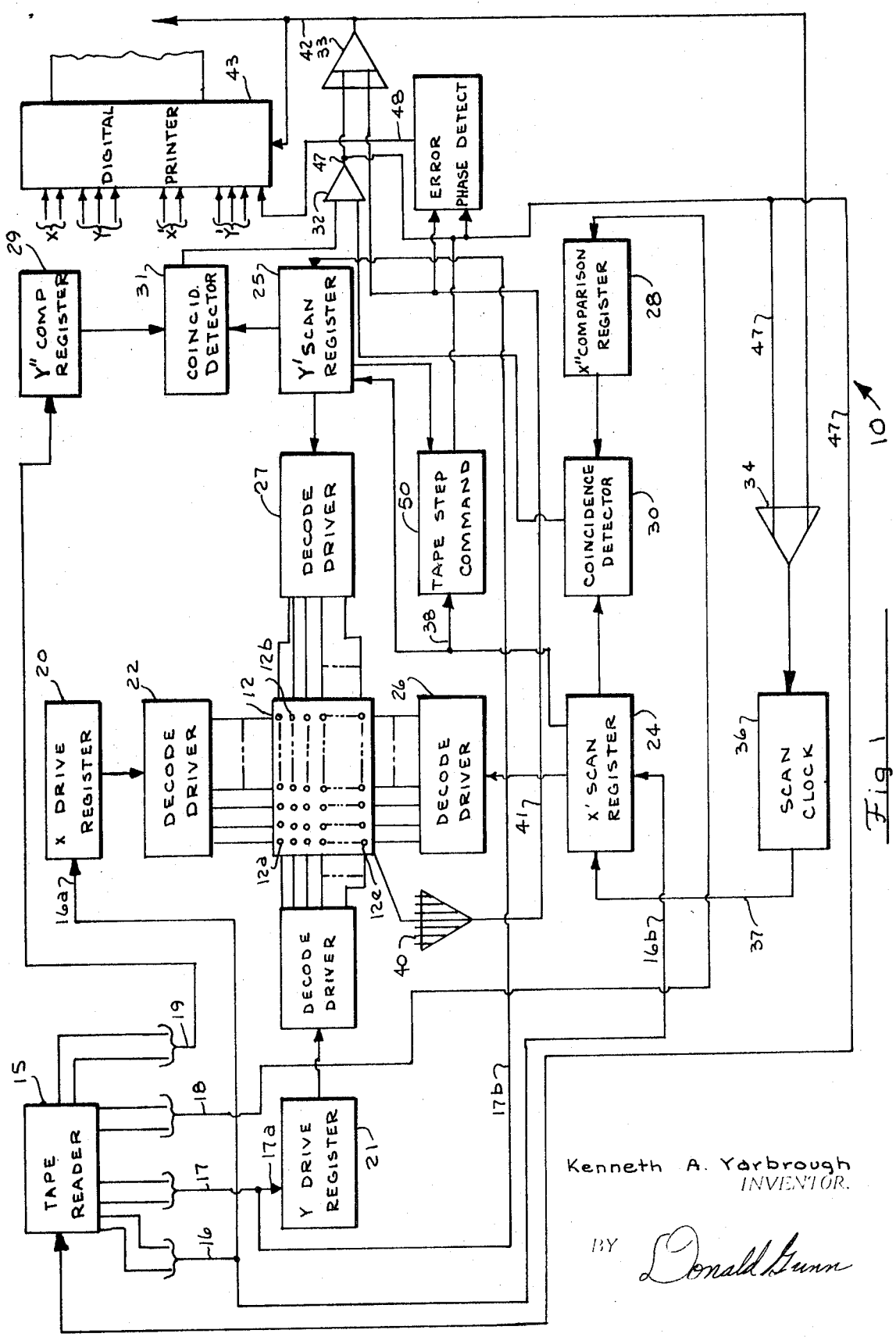
FIG. 1 is a block diagram schematic of the high-speed continuity test set of the present invention.

Attention is first directed to FIG. 1 of the drawings which illustrates in detail a block diagram schematic of the high speed continuity test set of the present invention which is indicated by the numeral 10. The test set is adapted to test a plurality of terminals which are indicated by the numeral 12. Note should be taken of the wide range of variations permitted in the terminals 12. They are preferably described by a coordinate system for the rows and columns; a matrix including 100 rows and 100 columns provides 10,000 terminals in one example described herein. Of course, the actual physical relationship of the terminals, one to the other, is of no consequence to the present invention. For instance, several terminals of the plurality of terminals may be physically remote from the remainder. This is of no consequence to use of the present invention. Moreover, the identification pattern of terminals is rectangular or square, as desired. In any event, the apparatus of the present invention is devised to cooperate with a plurality of terminals described by a two-coordinate system, with the maximum value of each coordinate being 100 in the chosen example.

For better understanding, three points in the matrix are presently defined. A drive point is first selected and a continuity condition is imposed on the drive point. For the present disclosure, the drive point is grounded, although, of course, other voltage levels can be imposed on the drive terminal. Secondly, a comparison point is the terminal of the plurality of terminals at which continuity with the drive point is expected. There may be only one, or more than one, comparison point for a given drive point, dependent on the wiring pattern. Thirdly, the scan point is the point being tested by the apparatus 10 at any given instant, and it may or may not be a comparison point. In operation, a drive point is first defined by coordinates and then one comparison point is defined for cooperation with the stated drive point. After cycling or scanning through the plurality of points to the comparison point, the apparatus then receives the coordinates of additional comparison points for the first drive point, if any. In the alternative, a new drive point is defined and grounded after which time a comparison point is ascertained and the testing begins anew. With these definitions in view, attention is redirected to FIG. 1 of the drawings which includes a tape reader 15 through which data is input to the present invention as will be described.

The tape reader 15 is one means of inputting data to the high speed continuity test set 10. The data input through the tape reader 15 includes the following: the coordinates of both the drive point to be selected for the apparatus and the comparison point. Each of the two points is described by two coordinates, preferably labeled "X" and "Y" coordinates hereinafter. Since the coordinates can range from zero to 99 (a span of 100 units), unit and decade decimal number representation is included in the medium read by the input device 15. These two points are defined by a total of eight decimal numbers, four of the decimal numbers identifying the drive point and the remaining four identifying the comparison point. The data for the drive point and the data for the comparison point is separated, one from the other, by its location on the tape. Thus, selected columns in the tape are reserved for the drive point and selected columns in the tape are reserved for the comparison point. In actual configuration, the above apparatus may take the form of a tape which is perhaps 32 columns in width to provide the BCD representation of the eight decimal numerals. In the alternative, a block tape reader is used with selected locations in each data block being designated for either drive point data or comparison point data. Even another alternative is the serial arrangement of the data on a narrow width tape, it being recognized that there are usually eight perforations across the tape, wherein four perforations transfer the BCD number while the remaining four perforations designate the storage register for the BCD number. At any event, the means 15 is an input device for receiving data from a storage medium.

Hand operated input devices such as thumb wheels, switches or the like, can be used to set in the data in lieu of the tape reader means 15. However, this alternative is best suited for short runs of the apparatus 10.

Preferably, the input data is in the form of binary coded digits. Each decimal digit is represented by four bits of data. The encoded decimal digits are communicated to components to be described by a number of input conductors 16 through 19, inclusive. Each of the conductors shown in FIG. 1 is in reality four conductors which are shown as one for clarity. Each of the four conductors carries the bits weighted to have values of 1, 2, 4 and 8.

Attention is directed to input conductors 16 and 17 which provide the drive point selection information. The conductors 16a and 17a communicate with the "X" and "Y" drive registers indicated by the numerals 20 and 21. The conductors being more specifically indicated by the numerals 16a and 17a. The registers 20 and 21 are capable of accepting numbers between zero and 99 to provide the 100 values of each of the two coordinates describing the plurality of terminals 12 in the exemplary structure considered herein. Each of the registers 20 and 21 is connected to a decode driver 22 and 23 which cooperate to ground the selected drive point identified by the data input by the means 15. The operation of the drivers 22 and 23 will be described hereinafter.

The data from the tape reader 15 is input through conductors 16b and 17b to scan registers 24 and 25. Scan registers 24 and 25 cooperate with decode drivers 26 and 27 which are similar in function to the drivers 22 and 23.

A contrast should be noted between the data placed in registers 20 and 21 as opposed to the data stored in registers 24 and 25. The data placed in the drive registers 20 and 21 is essentially static since it indicates the drive point. The data in the registers 24 and 25 is dynamic since it indicates the coordinates or location of the particular terminal scanned at any one instant, recognizing that the scanning rate is perhaps 100,000 or more terminals per second. More will be noted concerning these differences hereinafter.

The input conductors 18 and 19 from the tape reader means 15 communicate with a pair of comparison registers 28 and 29. Coincidence detectors 30 and 31 obtain comparisons between the scan and comparison registers for each of the two coordinates. As previously noted, the comparison point is the next terminal anticipated to have continuity with the selected drive terminal. Again, it should be recalled that several terminals may possibly have continuity with one drive point, and in this event, there will be several comparison points for one drive point. The coincidence detectors 94 comparators 30 and 31 determine equality of the coordinates stored in the various registers to determine when the scanned terminal is the same as the comparison point. This is of significance because the terminal is expected to have continuity with the drive point. Additional means to be described test for continuity to confirm the anticipation indicated by the coordinates stored in the registers 28 and 29.

When a comparison is obtained from the detectors 30 and 31, the outputs thereof are communicated to an AND gate 32 which communicates at its output with an exclusive OR gate 34. The OR gate 34 provides a scan inhibit signal to a scan clock means 36. The scan clock means 36 provides timed pulses through a conductor 37 to the scan register 24. During scanning of the plurality of terminals 12, the information in the register 24, having been first set by the data word input over the conductor 16b, is incremented by the pulses supplied over the conductor 37. When the scan register 24 overflows by counting to the highest possible value to be stored therein, the overflow creates a pulse in a conductor 38 to the scan register 25. It should be understood that overflow or spill-over is in the form of an increment added in the register 25 to increase the count stored in the register 25. Moreover, this only occurs simultaneous with resetting of the register 24 to zero. It will be appreciated that, with the above over-flow sequence, rows of the terminals 12 are scanned sequentially. For instance, the row 12a is scanned from left to right as shown in the drawing, then the row 12b is scanned. The sequence is repeated until the row 12e is scanned, and upon arrival at the last terminal, the scanning is completed for the given drive point and the tape reader means 15 is advanced to the next drive point. It will be appreciated that the interlacing of test points, row upon row, is controlled by inputting the high frequency pulses from the scan clock 36 to the scan register 24, and thereafter incrementing the scan register 25. Of course, the above described technique can be applied to columns with the scanning accomplished vertically in the various columns of the matrix 12.

Attention is next directed to the OR gate 40 which provides an output level of a conductor 41 when the scanned terminal has continuity with the driven terminal. The OR gate 40 passes a pulse from the scanned terminal (selected by the scan registers 24 and 25 and the decode drivers) which indicates that continuity has been ascertained.

The conductor 41 is communicated to the exclusive OR gate 33. As previously noted, the gate 32 provides a signal for an anticipated continuity. Should the fact of continuity be established for any terminal and a signal formed by the gate 40, the conductor 41 inputs the signal to the gate 33 coincident with the signal from the gate 32. The exclusive OR gate provides no output if signals arrive at both inputs. This is, of course, an indication of no error. On the other hand, the absence of either input signal forms an error signal on the conductor 42 which communicates with a digital printer 43. Other inputs to the digital printer 43 are the numbers stored in the registers 20, 21, 24 and 25 wherein the registers are wired to the printer 43 which is enabled to print the data in the registers on occurrance of an error. The error print-out includes the coordinates of the drive and scan terminals. Moreover, the conductor 42 is an input to the OR gate 34 which also inhibits operation of the scan clock 36 for an interval to permit the digital printer 43 to process the information, it being appreciated that the digital printer 43 is slower in operation than the electronic apparatus described hereinabove.

It is necessary to ascertain the nature of the error identified by the coordinates printed by the digital printer 43. To this end, an error-phase detection circuit 46 is provided. The OR gate 40 communicates through the conductor 41 to the error phase detection circuit 56. Likewise, an input is obtained through a conductor 47 from the gate 32 which indicates coincidence between the scanned terminal and the comparison point. The existence of continuity at a scanned terminal in excess of that desired is arbitrarily defined as a positive error and the error phase detection circuit means 46 provides a signal on the conductor 48 to include a plus mark printed by the printer means 43. On the other hand, should the comparison point in the grid coincide with the scan point (sensed by the coincidence detector means) and indicated by the AND gate 32, and further should the OR gate 40 provide no output indicating the absence of continuity in actuality, a wire is missing, and a minus sign is printed by the digital printer means 43. This indicates a deficiency in the actual wiring wherein continuity is anticipated at the terminal but the connection is not in fact made.

The conductor 38 and an additional conductor 49 from the registers 24 and 25 are both input to a tape step command generator 50. As previously described, the conductor 38 provides a signal when the scan register 24 over flows, or has therein the maximum number which can be stored. This condition also occurs in the scan register 25. Overflow of both scan registers at the same instant indicates that the scanning has proceeded from the terminal represented graphically in FIG. 1 at the upper left to the terminal at the lower right. This, of course, implies total scanning of all terminals. Again, the physical relationship and arrangement of the terminals is subject to wide variation. At any event, the conductors 38 and 49 are input to the means 50 which indicates overflow of both registers 24 and 25. When overflow is simultaneous, the means 50 provides an output signal on the conductor 47 which serves as the tape step command for the tape reader means 15.

It should be noted that the tape reader means 15 is stepped by occurrence of several events. For instance, should the scanning of the plurality of terminals 12 arrive at a comparison point as sensed by the coincident detectors 30 and 31, the AND gate forms a signal on the conductor 47 which advances the tape. Secondly, should scanning proceed to the last terminal and the signal be formed by the tape step command means 50, the tape is also stepped to obtain new information for the present invention.

It is believed that the foregoing describes generally the overall operation of the present invention. However, as a means of furthering understanding of the present apparatus, attention is directed to FIG. 2.

Figure 2:
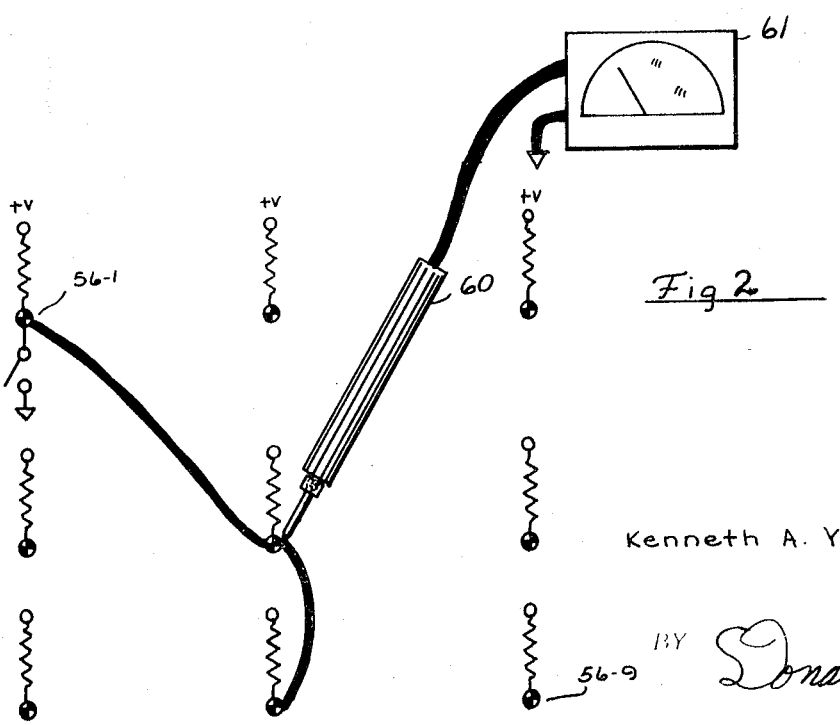
FIG. 2 is a simplified representation of a terminal pattern introducing the philosophy of the test of the present apparatus.

A simplified terminal pattern is indicated in FIG. 2 with a number of terminals, nine to be exact, indicated by the numerals 56–1 through 56–9, inclusive. It will be noted that a wiring pattern is anticipated which includes the first, fifth and eighth terminals connected by the conductor 57. A switch 58 connected to the terminal 56–1 is closed to ground. A positive voltage, 12 volts in the preferred embodiment, is communicated with the terminal 56–1 through a resistor 59. In testing the nine terminals shown in FIG. 2, a volt meter probe 60 connected with a volt meter 61 is connected to each of the terminals in any desired order to ascertain continuity with the terminal 56–1. With the switch 58 closed to ground the terminal, all continuous points are likewise grounded. On the other hand, all terminals not so grounded are at the positive voltage resulting from their connection with the B+ supply. Hand techniques will scan nine terminals for continuity with adequate speed. However, hand techniques are certainly unreasonable for large arrays including 5 or 10,000 terminals or even more. For an understanding of means for automatically grounding (or driving) the selected terminal 56–1, attention is next directed to FIG. 3 of the drawings.

Figure 3:
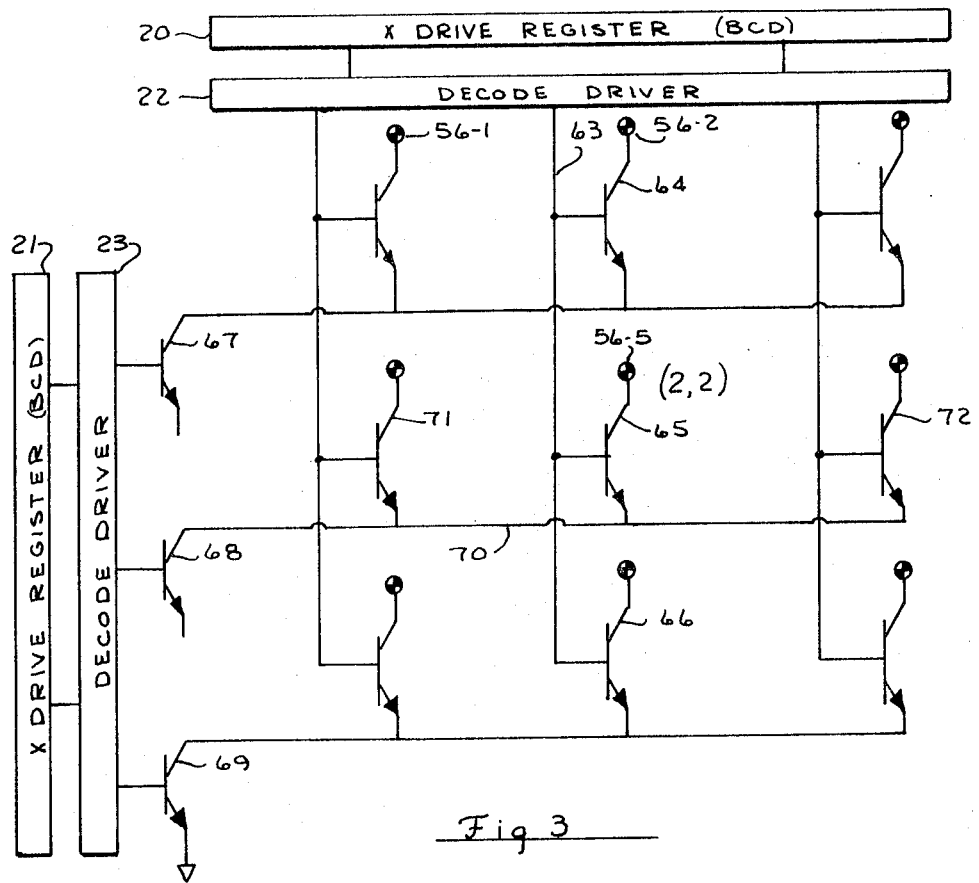
FIG. 3 is a partial schematic of circuitry for grounding a selected terminal to initiate testing for continuity with other terminals in the plurality of terminals.

It will be noted first of all that the "X" and "Y" drive registers 20 and 21 are shown in FIG. 3 communicated with the decode drivers 22 and 23. The logic output of each of the decode drivers is a true or one signal used in the following manner: The decode driver forms a level on a selected conductor numbered with the "X" coordinate of the drive point. For purposes of illustration, the second conductor 63 is energized; the conductor 63 is the base voltage for several transistors arranged in a column and identified by the numerals 64, 65 and 66. Of course, the "X" designation is input by the tape reader means 15 (see FIG. 1).

The "Y" select information chooses rows of transistors to be energized in the matrix as will be described. More particularly, the decode drive 23 outputs a logic level which is a one or true signal to either of transistors 67, 68 or 69. For purposes of illustration, the selected transistor is the transistor 68. The signal from the decode driver 23 (a logical one) is applied to the base of the transistor 68 to turn on the switching transistor. It will be noted that the emitter of the transistor 68 is grounded. When the transistor is switched on, it effectively grounds a conductor 70 which provides the emitter connection for transistors 71, 65 and 72. It will be noted that base conditions on the transistors 71 and 72 are insufficient to cause conduction of these transistors. However, the transistor 65 has both the proper base voltage and the needed emitter connection. As the saturated transistor conducts, the terminal 56–5, now indicated by the "X–Y" coordinates 2,2 is electronically grounded. It will be noted that the transistors 64 and 65 have suitable base voltages to cause conduction but do not have proper emitter connections to permit current flow.

The foregoing illustrates how a selected point is grounded. For purposes of clarity, the resistor 59 (see FIG. 2) and the positive supply have been omitted from FIG. 3; together, they complete the collector circuit for each transistor. As a matter of nomenclature, the terminals are identified in FIG. 3 with the "X–Y" coordinate system rather than serial numbering which is preferable for large arrays best tested by the present invention.

In summation, it will be noted that each terminal is associated with a collector resistor communicated with a B+ supply. When driven, the terminal is electronically grounded by operation of the decode drivers 22 and 23 which respond to the "X" and "Y" coordinates of the driven terminal. As defined herein, the driven terminal is effectively grounded by turning on a switching transistor utilizing the collector resistor and associated positive supply to complete the circuitry. Thus, when the driven terminal is grounded, all points having continuity therewith are likewise grounded.

Figure 4:
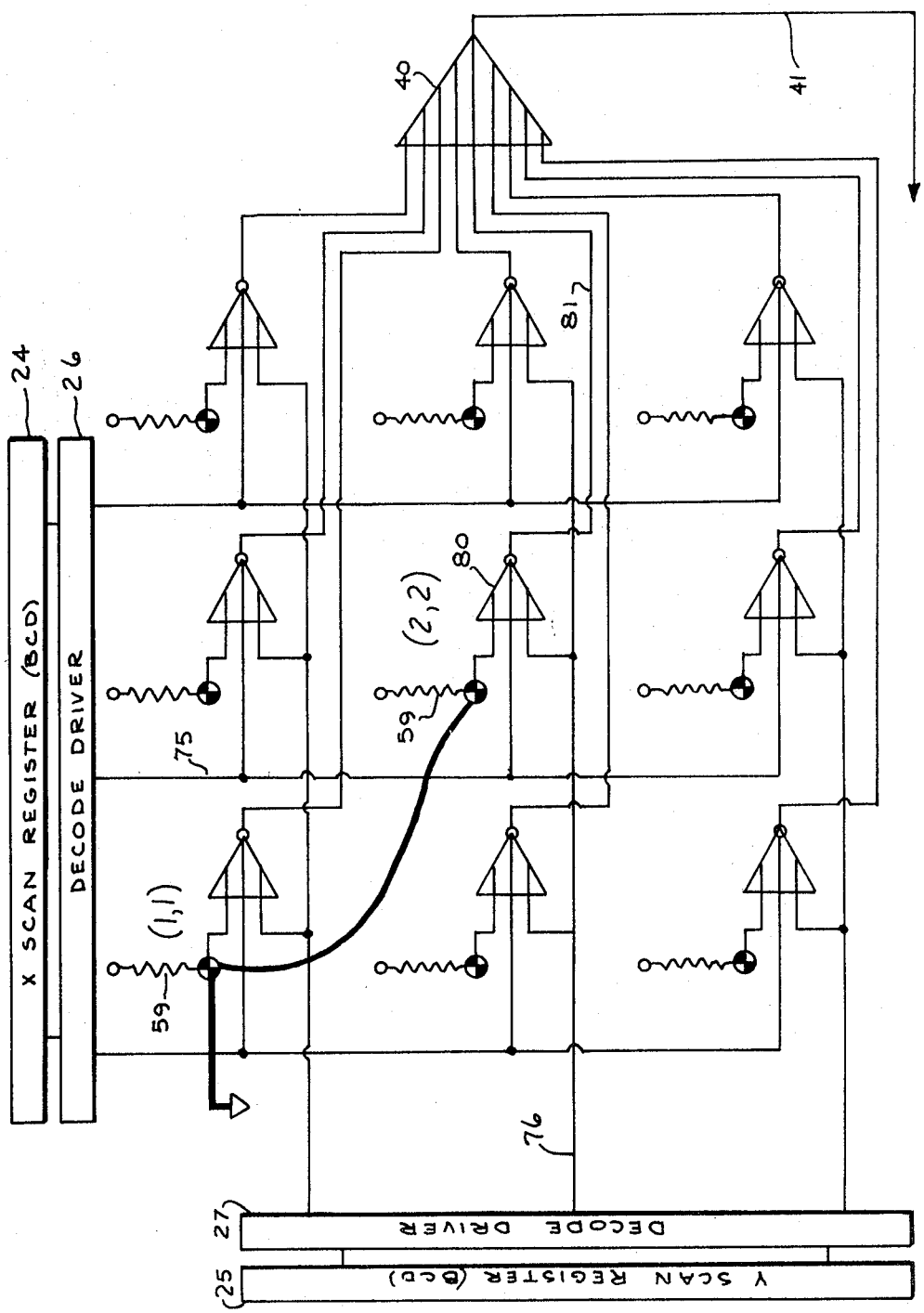
FIG. 4 is a schematic of scanning apparatus for testing the plurality of terminals for continuity with the terminal grounded by the circuitry shown in FIG. 3.

Attention is next directed to FIG. 4 of the drawings which indicates apparatus for scanning an examplary matrix also including nine terminals. Since the function of FIG. 4 is to convey an understanding of how the apparatus scans all terminals save the driven terminal, the first terminal (having the coordinates 1,1) is grounded by operation of the apparatus described hereinabove. Therefore, scanning the remainder of the terminals will be explained assuming the terminal having the "X–Y" coordinates 2,2 is hard wired to the grounded or driven terminal located at 1,1. The decode drivers 26 and 27 are similar in function and communicate with a number of conductors arranged either in rows or columns. The "X" scan register inputs a number to the driver 26 which selects a numbered conductor to be grounded as required by the number in the scan register 24. In the example of FIG. 4, the conductor 75 is grounded whereas the remaining conductors are not. Likewise, a number in the "Y" scan register 25 is decoded by the means 27 whereby a conductor 76 is also grounded whereas the remainder of conductors from the decode driver 27 are not grounded.

By definition in the two coordinate system, only the terminal at coordinate 2,2 obtains coincidence of scan signals. The scanned or selected terminal determined by the coordinates input to the registers 24 and 25 is then tested for continuity with the driven point in the following manner.

As previously noted, each of the terminals is communicated with some positive supply through a resistor 59. If there is continuity, the hard wiring to the driven terminal grounds the scanned terminal. This pulls the voltage at the terminal from the supply voltage to approximately ground potential. A NOR gate 80 having three input terminals is communicated with the terminal in question, the "X" line 75, and the "Y" line 76. The "X" and "Y" lines input two false signals to the NOR gate 80. Should the terminal bearing coordinates 2,2 be wired to the driven terminal and therefore grounded, the third input to the NOR gate 80 is likewise false, and the output of the NOR gate 80 is a true signal supplied to a conductor 81. The conductor 81 communicates with the massive OR gate 40 described previously.

While the foregoing describes how the condition of one terminal is ascertained, it should be generalized that each of the plurality of terminals has its own NOR gate wired in the same manner. More particularly, each NOR gate has three inputs which include a connection to the terminal itself, a connection to the "Y" scan line, and a connection to the "X" scan line with the "X" and "Y" scan lines specified by coordinate numbers. Moreover, all of the NOR gates, there being one per terminal, are input to the massive OR gate 40 which has as many inputs as there are terminals. In the example shown in FIG. 4, the gate 40 has nine inputs and will provide a true output should any of the NOR gates provide a true input to the gate 40.

While the foregoing describes the operation when continuity is determined at a given terminal, whether expected or unexpected, it will be appreciated that the scanning means is stepped as the "X" scan register 24 is incremented at a high rate of speed. More will be noted concerning this hereinafter.

Attention is next directed to FIG. 5 of the drawings which illustrates a 25-terminal pattern for purposes of example. The grid pattern is shown in a 5 by 5 arrangement, bearing "X" and "Y" coordinates. Table 1 lists the coordinates for the various drive points and comparison points. One conductor 82 is wired to five terminals in one pattern. The uppermost and leftwardly located terminal is selected as the drive point since it is approached systematically first counting from the origin of the coordinate system. Therefore, the first entry in the table of coordinates is the drive terminal for the conductor 82; one drive terminal per wire is needed. The next four entries included in Table 1 are the coordinates of anticipated points of continuity, all common to the conductor 82. In operation, the apparatus grounds the drive point terminal which has the coordinates 0,0. Scanning commences by rows, and runs at a high rate of speed until the terminal having the coordinates 1,1 is reached. At this juncture, continuity is ascertained to confirm the wiring. Thereafter, the coordinates of the second comparison point (1,2) are entered in the comparison register and scanning continues sequentially in the second row of the array. The scanning proceeds until the next comparison terminal is reached. The above routine is repeated sequentially until the last comparison point is ascertained, the point bearing coordinates 3,3. After verification of this terminal, the scanning process continues through all of the remainder of terminals to the lower right hand terminal shown in the programming model of FIG. 5. Scanning to this terminal causes spill over of the scan registers and the tape step command means 50 (see FIG. 1) which then advances the tape to the next drive point.

In FIG. 5, the next drive point bears the coordinates 1,0 and is the first of five terminals common to the conductor 83. The procedure described for the conductor 82 is repeated wherein the comparison points are certified to be common with the drive point and all remaining terminals are confirmed to not have continuity with the conductor 83. Continuing on down Table 1, conductors 84 and 85 are likewise confirmed.

Certain economies in programming the data input to the test apparatus 10 reduce the operation time. Attention is directed to the four drive points listed in Table 1. It will be noted that the drive points are arranged proceeding from the upper left corner of the array toward the lower right corner. Considering the last drive point which has the coordinates of 3,0, usually there is no benefit in scanning terminals to the left of this drive point. This is because terminals to the left or above have been previously tested with other drive points. The scanning from the last drive point through a lesser number of terminals reduces total scan time. Implementation is achieved by connection of the conductors 16b and 17b to the scan registers as shown in FIG. 1. Of course, on omission of these conductors to the scan registers, it is permissible to start scanning from the terminal having the coordinates 0,0. However, through the use of the conductors 16b and 17b input to the scan registers, as the test program is executed, the number of terminals remaining to be scanned in the latter portions of the program is substantially reduced.

To enhance the speed of operation, a means can be included to prevent the system from detecting continuity of the drive point with itself. Recalling the fact that the drive point coordinates are input both to the drive registers and to the scan registers, the first test of the terminals 12 will reveal continuity of the drive point itself. Rather than obtain the obviusly anticipated continuity, it is preferably to augment the number in the "X" scan register by one prior to initiating scanning of the terminals.

Attention is next directed to FIG. 6 of the drawings which illustrates a decode driver for use with the present invention. As shown in FIG. 1, four decode drivers are communicated with the matrix of terminals 12. As was shown in FIG. 3, decode drivers 22 and 23 provide true level signals which, depending on the logic levels chosen, are preferably positive voltages such as 6 or 12 volts. As shown in FIG. 4, decode drivers 26 and 27 provide false logic levels which are preferable ground potential. Of course, other voltage levels can be used by choosing different circuit elements but it is preferable to select ground as the false level because of the possibility of grounding a terminal to the chassis even with no wired connection to it. However, the differences are noted in the drive decoders and the scan decoders as being within the purview of one skilled in the art. In FIG. 6, two portions of the "X" drive register are represented at 90 and 91. The two portions are similar except that one stores the units decimal digit and the other stores the 10s digit. As will be understood, additional data is stored in conformance with the decimal numbering system in additional registers. The BCD representation of the units and 10s is placed in the registers 90 and 91 as four bits of information. Each register incorporates output lines which are weighted 1, 2, 4 and 8. The output conductors from the decimal registers 90 and 91 are each input to decoding circuits indicated by numerals 92 and 93. The decoders 92 and 93 convert the four wire, 4-bit representation of the decimal numerals into 10 signals on 10 wires. If desired, a set of power drivers 94 is incorporated in the 10 output lines. Because of the loading problems, this precuation is best taken with the apparatus shown. The function of the power drivers is to furnish a suitable current flow.

The numeral 95 indicates a decade decode unit which is responsive to information in both the registers 90 and 91. The apparatus 95 has ten output conductors. Should the "X" coordinate of the selected terminal be between zero and nine, this is represented by some number stored in the register 90 and a zero stored in the register means 91. The zero from the 10s-digit register 91 is symbolized by a signal on the conductor 95a which enables all 10 gates within the decade decode unit 95. One form of the decade decode unit 95 includes 10 AND gates which are all enabled by the signal on the conductor 95a. Then, one of the plurality of conductors from the power drivers means 94 conveys a signal which selects one of the AND gates to form an output signal related to the number in the register 90.

Attention is also directed to the decade decode unit 96. It is similar to the decode unit 95, with the exception that a conductor 96a provides a signal from the 10s-digit register 91. The signal results from a "one" in the tens register and is associated with a number between 10 and 19. The above arrangement is repeated by decades whereby 10 decade decode units drive 100 conductors.

Should a greater number of conductors, say 1,000, be desired, the hundreds digit is also stored in a register similar to the registers 90 or 91, is converted from BCD to 10 wired signals by means similar to the means 92 and 93, and additional inputs are provided in each of the decade decode units to be qualified by the 100s-signal level. The above process is exemplary of one means of decoding the decimal representations of terminals in the matrix 12.

Attention is next directed to FIG. 7 of the drawings which illustrates a coincidence detector means 30 adapted for use in the circuit shown in FIG. 1. For purposes of simplification, the apparatus shown in FIG. 7 is abbreviated because additional digits are handled repetatively. The numeral 101 represents a first register for receiving the units decimal digit in BCD form.

The numeral 102 represents a second and corresponding register, the intention being to compare the decimal numerals stored in the two registers. The numerals 103 and 104 each represent the 10s-registors cooperative with the units registers 101 and 102. Each of the decade registers is divided into four portions for storing the four bits which define a decimal number. The bits are weighted in some customary pattern, one acceptable pattern being the 1, 2, 4, 8 representation adapted for the present invention. Each of the four bits in the registers 101 and 102 has output conductors to one of several exclusive OR gates 106, 107, and so on. An exclusive OR gate is connected to equally weighted bits in the registers for the units, 10s and all additional decimal numbers without limitation.

The gates 106, 107 and 108, and all similar gates are input to an OR gate 110. The gate 110 provides an output on non-comparison in the following manner. Considering the gate 106 by way of example, should its input signals from the registers 102 and 101 be identical, the gate 106 provides no output. However, should non-coincidence occur, the gate 106 provides an output signal to the gate 110. The gate 110 forms an output signal which indicates the equality of the numbers stored in the registers.

The circuitry shown in FIG. 7 is particularly suited for adaption as the coincidence detectors 30 and 31 shown in FIG. 1.

With a view of fully describing the apparatus incorporated in the present invention, it should be noted that the tape reader means 15 and the digital printer means 43 are normally bought items and many models of acceptable equipment are on the market. The various registers incorporated with the present invention are likewise bought items, or else they can be fabricated. Of course, the registers 20 and 21 store static information and are different from the scan registers. Likewise, the registers 28 and 29 do not operate at high speeds. However, the scan register 24 operates at a high rate of speed because it has the scan clock 36 as the incrementing input. More should be noted concerning the speed of the registers 24 and 25. The speed of operation of the present invention is dependent in large part on the rate of operation of the scan registers 24 and 25. Depending on the character of the circuitry selected, speeds on the order of 100,000 or more hertz are achieved. The speed requirements imposed on the scan registers are also imposed on the decode drivers which select the "X" and "Y" coordinate wires.

Considering further the actual construction of the present invention, the massive OR gate 40 symbolically is shown with inputs from all of the terminals 12. Should there be 10,000 terminals, the gate 40 has 10,000 inputs. Since this is unwieldy of fabrication, it is possible to use a pyramid of OR gates working up through three or four levels to provide a single output conductor. For instance, 10,000 terminals can be summed in one OR gate function by 1,111 10-input OR gates arranged in pyramid fashion; of course, other arrangements are available.

Numerous alterations in the preferred embodiment 10 have been discussed herein and should be considered further. For instance, the matrix 12 is shown as a square pattern. This is not necessarily required. For instance, apparatus manufactured for installation in telephone exchanges has a matrix of 48 by 112 terminals. Assuming the "Y" coordinate is the larger dimension, a third decade is added to the registers storing the "Y" coordinate data. More specifically, the registers 21, 25 and 29 are increased to receive a third decimal number. In the above cited example, the 100s digit is de minimus since it can assume only two values, zero or one, and no other. Therefore, only a 1-bit storage means is needed in this case. Moreover, those skilled in the art can include the gating in the registers reset to zero on counting to number other than full capacity of the register. As discussed hereinbefore, with the 100 by 100 pattern, recycling of the "X" scan register was accomplished on cycling through 100 steps. This is not required since the appropriate gating is available to the art.

Other alterations are within the scope of the present invention, and can be adapted after achieving an understanding of the disclosure contained herein. However, the scope of the present invention is not limited by the preferred embodiment described hereinabove, but is within the spirit of the claims appended hereto.

I claim:

1. A test apparatus for testing for undesired electrical connections among a plurality of terminals with selected conductive paths connected to at least two of such terminals wherein the number of terminals may be increased essentially without limit and wherein the terminals are subject to designation in a coordinate system and have locations given by 1, 2, 3, .... M, and 1, 2, 3, 4, .... N, in X–Y coordinates and the apparatus comprising:

first means connected to a plurality of the terminals;
said first means including an X storage register means of M capacity and a Y storage register means of N capacity;
means for inputting to said X and Y storage register means a X–Y designation of a terminal;
signal forming means for imposing an electrical condition at the terminal indicated by the designation in said X and Y storage register means;
a gate means connected to each of the plurality of terminals to be scanned, said gate means being connected to the plurality of terminals in a manner such that an indicia of the electrical condition of the terminal is communicated to said respective gate means;
second X and Y storage register means having respectively capacities of M and N;
means for inputting a terminal designation signal into said second X and Y storage register means of value equal to or less than M and N to designate a terminal;
connective means connected so said second X and Y storage register means, said connective means forming unique enable signals for selected ones of said gate means;
said gate means, on receipt of enable signals, enabling said gate means to form output signals related to the electrical condition of the terminals connected thereto; and,
comparator circuit means provided with output signals from said gate means and also adapted to be provided with signals to be compared with such output signals, and forming a comparative output signal when the compared signals achieve a desired comparison.

2. The invention of claim 1 wherein said first means includes switching transistor means connected to each of the plurality of terminals, and said first X and Y storage register means are connected to said switching transistor means such that a unique designation of a terminal encoded as X and Y values equal to or less than M and N respectively alters the operative condition of one of said switching transistor means.

3. The invention of claim 2 wherein said one switching transistor means has one terminal connected to one of a plurality of conductors common to X-coordinates of the terminals, and another terminal connected to one of a plurality of conductors common to Y-coordinates of the terminals.

4. The invention of claim 3 including a decoder means connected to said first X storage register means which forms a binary signal on only one of said conductors common to X-coordinate terminals.

5. The invention of claim 3 including a decoder means connected to said first Y storage register means which forms a binary signal on only one of said conductors common to Y-coordinate terminals.

6. The invention of claim 3 wherein additional of said switching transistor means are connected to the one of the plurality of conductors but all of which are not altered in operative condition.

7. The invention of claim 6 wherein each of said gate means has three inputs which are:

the first is connected to the terminal associated therewith;
the second is connected to one of the X-coordinate conductors; and,
the third is connected to one of the Y-coordinate conductors.

8. The invention of claim 1 wherein said comparator means receives as an input the coordinates in said second X and Y storage register means, and signals giving X and Y coordinates of a selected terminal.

9. The invention of claim 1 wherein said first X and Y storage register means are incremented by a clock means running freely until stopped by a predetermined event until said first and second storage means have counted jointly to a maximum of M by N in a sequential pattern.

* * * * *